(12) United States Patent
Cozza

(10) Patent No.: US 9,395,039 B2
(45) Date of Patent: Jul. 19, 2016

(54) FLAT SCREEN DISPLAY ANTI-TIP DEVICE

(71) Applicant: Giuseppe Mike Cozza, Garnet Valley, PA (US)

(72) Inventor: Giuseppe Mike Cozza, Garnet Valley, PA (US)

(*) Notice: Subject to any disclaimer, the term of this patent is extended or adjusted under 35 U.S.C. 154(b) by 0 days.

(21) Appl. No.: 14/466,161

(22) Filed: Aug. 22, 2014

(65) Prior Publication Data

US 2015/0053840 A1  Feb. 26, 2015

Related U.S. Application Data

(60) Provisional application No. 61/870,028, filed on Aug. 26, 2013.

(51) Int. Cl.
  *A47B 97/00* (2006.01)
  *F16M 13/02* (2006.01)
  *F16M 11/22* (2006.01)

(52) U.S. Cl.
  CPC .............. *F16M 13/02* (2013.01); *F16M 11/22* (2013.01); *F16M 2200/08* (2013.01)

(58) Field of Classification Search
  CPC ........ F16M 11/08; F16M 11/10; F16M 13/02; F16M 11/22; F16M 2200/08; F16P 1/00
  See application file for complete search history.

(56) References Cited

U.S. PATENT DOCUMENTS

| | | | | |
|---|---|---|---|---|
| 6,935,686 B1 * | 8/2005 | Liao | ............................... | 297/252 |
| 7,690,617 B2 * | 4/2010 | Takao | ............................ | 248/499 |
| 7,740,218 B2 * | 6/2010 | Green | ............................ | 248/351 |
| 8,334,936 B2 * | 12/2012 | Takao | ............................ | 348/836 |

* cited by examiner

*Primary Examiner* — Amy Sterling
(74) *Attorney, Agent, or Firm* — Pepper Hamilton LLP

(57) ABSTRACT

An anti-tip device for preventing the tipping of a display device that includes a first portion extending a first portion length between a first portion proximal end and a first portion distal end. The anti-tip device includes a second portion extending away from and extending substantially orthogonal to the first portion, the second portion extending a second portion length between a second portion proximal end and a second portion distal end and configured to be coupled to a holding unit configured to hold a flat screen display. When the second portion is coupled to the flat screen display holding unit and the base contacts the first portion, the first portion is configured to prevent the flat screen display from tipping on the holding unit.

13 Claims, 8 Drawing Sheets

FLAT SCREEN DISPLAY ANTI-TIP DEVICE

CROSS REFERENCE TO RELATED APPLICATIONS

This application claims priority to U.S. Provisional Patent Application No. 61/870,028, filed on Aug. 26, 2013 and entitled Flat Screen Display Anti-Tip Device, the contents of which are included in their entirety by reference herein.

TECHNOLOGY FIELD

Embodiments relate generally to an anti-tip device for preventing the tipping of a flat screen display, and more particularly to an anti-tip device mounted to a flat screen display holding unit and configured to contact a base of the flat screen display to prevent the tipping of the flat screen display on the flat screen display holding unit.

BACKGROUND

Flat screen displays, such as flat screen television monitors and computer display monitors, do not require large interior components (e.g., cathode ray tubes). Accordingly, the bodies (e.g., display screens) of these flat screen displays are typically very thin (e.g., less than 4.0 in). While some of these conventional flat screen displays are mounted on walls, others are placed on top of a flat screen display holding unit, such as a television stand, an entertainment center, a desk, a chest of drawers a night stand or other units that may hold the flat screen displays.

The flat screen displays typically include bases under the display screens that are placed on top of the holding units. The screen dimensions (length and height) of these flat screen displays have become increasingly larger to enhance a user's visual experience, causing many flat screen displays to have a high center of gravity.

SUMMARY

Embodiments include an anti-tip device for preventing the tipping of a display device. The anti-tip device includes a first portion extending a first portion length between a first portion proximal end and a first portion distal end. The anti-tip device also includes a second portion extending away from and extending substantially orthogonal to the first portion. The second portion extends a second portion length between a second portion proximal end and a second portion distal end and configured to be coupled to a holding unit configured to hold a flat screen display. When the second portion is coupled to the flat screen display holding unit and the base contacts the first portion, the first portion is configured to prevent the flat screen display from tipping on the holding unit.

In one embodiment, the anti-tip device further includes a mounting element configured to be mounted to the flat screen display holding unit and coupled to the second portion. The second portion is coupled to the flat screen display holding unit when the mounting element is mounted to the flat screen display holding unit.

In another embodiment, the mounting element includes a mounting element coupling hole and the second portion comprises a plurality of second portion coupling holes each vertically spaced from each other. The second portion is configured to be vertically adjustable relative to the mounting element by coupling the second portion to the mounting element via one of the plurality of second portion coupling holes and the mounting element coupling hole.

According to one embodiment, the mounting element comprises a plurality of mounting holes each vertically spaced from each other. The mounting element is configured to be vertically adjustable relative to the holding unit by coupling the mounting element to the holding unit via one of the mounting holes.

According to another embodiment, the first portion and the second portion are semi-cylindrical and the first portion and the second portion are configured to receive one or more electrical mediums coupled to the flat screen display within an underside that faces the holding unit.

In an aspect of an embodiment, the first semi-cylindrical portion further comprises opposing bottom edges, each of the opposing bottom edges configured to contact the base and prevent the flat screen display from tipping on the holding unit.

In another aspect of an embodiment, each of the opposing bottom edges comprise a protective portion configured to contact the base, each protective portion formed of material to at least one of: (i) prevent damage to the base; and (ii) provide increased friction between each protective portion and the base when the base contacts each protective portion.

In one embodiment, each protective portion is formed of a material from a group of materials comprising rubber, foam, felt, and plastic.

Embodiments include an anti-tip device for preventing the tipping of a display device. The anti-tip device includes a first semi-cylindrical portion extending horizontally between a first portion proximal end and a first portion distal end and configured to be parallel with a top of a base of a flat screen display. The anti-tip device also includes a second semi-cylindrical portion extending vertically away from and substantially orthogonal to the first semi-cylindrical portion, and extending between a second portion proximal end and a second portion distal end, the second semi-cylindrical portion configured to be coupled to a flat screen display holding unit. The anti-tip device further includes a mounting element configured to be coupled between the flat screen display holding unit and the second semi-cylindrical portion. The mounting unit includes a semi-cylindrical coupling portion configured to be coupled to the second semi-cylindrical portion; and one or more mounting portions configured to be mounted to the holding unit.

According to one embodiment, the one or more mounting portions comprise a pair of opposing mounting portions each extending away from the semi-cylindrical coupling portion, and configured to be substantially parallel with a rear of a holding unit and mounted to the holding unit.

According to another embodiment, the first semi-cylindrical portion and the second semi-cylindrical portion are each configured to receive one or more electrical mediums coupled to the flat screen display.

In one embodiment, when the mounting element is mounted to the holding unit, the second semi-cylindrical portion is configured to vertically adjust relative to the mounting element.

In another embodiment, the mounting element is configured to vertically adjust relative to the holding unit.

In an aspect of an embodiment, the first semi-cylindrical portion further includes opposing bottom edges extending along the first semi-cylindrical portion, each of the opposing bottom edges configured to prevent the flat screen display from tipping on the holding unit when the base contacts the opposing edges.

In another aspect of an embodiment, each of the opposing bottom edges comprises a protective portion configured to contact the base and prevent damage to the base when the base contacts each protective portion.

Embodiments include an anti-tip device for preventing the tipping of a display device on a flat screen display holding unit. The anti-tip device includes an anti-tip element comprising an anti-tip body extending between: (i) a first end configured to contact a flat screen display; and (ii) a second end configured to contact a flat screen display holding unit. The anti-tip element is configured to prevent the flat screen display from tipping when: (i) the first end contacts the flat screen display and (ii) the second end contacts the flat screen display holding unit.

In one embodiment, the anti-tip device further includes a mounting element coupled to one of the first portion and the second portion and configured to be mounted to the flat screen display holding unit.

In one embodiment, the mounting element is coupled to the second portion and configured to be mounted to a rear of the flat screen display holding unit.

According to one embodiment, the mounting element is coupled to the first portion and configured to be mounted to a top of the flat screen display holding unit.

According to another embodiment, the anti-tip element is configured to be coupled to one of: (i) the base; and (ii) the flat screen display holding unit.

Additional features and advantages of the embodiments will be made apparent from the following detailed description of illustrative embodiments that proceeds with reference to the accompanying drawings.

BRIEF DESCRIPTION OF THE DRAWINGS

The foregoing and other aspects of the embodiments are best understood from the following detailed description when read in connection with the accompanying drawings. For the purpose of illustrating the embodiments, there is shown in the drawings embodiments that are presently preferred, it being understood, however, that the embodiments are not limited to the specific instrumentalities disclosed. Included in the drawings are the following Figures.

DETAILED DESCRIPTION OF ILLUSTRATED EMBODIMENTS

Despite the bases of flat screen displays, contact with the flat screen displays (e.g., television monitors) and/or the holding units (e.g., television stands) may still cause accidental tipping of the flat screen displays. For example, children attempting to climb the holding units and/or touch the flat screen displays may cause the flat screen displays to tip over. In some cases, the flat screen displays may tip over in one of multiple directions (e.g., forward and backward) and fall to the ground, damaging the television. In other cases, the television may fall on top of a child, causing serious bodily injury and possibly even death.

Embodiments provide an anti-tip device for preventing the tipping (e.g. forward, backward) of a flat screen display, such as a flat screen television display. Embodiments provide an anti-tip device that is mounted to an area of a display device holding unit behind the display device and contacts a top of a base coupled to the display device to prevent the display device from tipping. Embodiments provide an anti-tip device that conceals electrical mediums (e.g., wires, cords, cables and the like) connected to the display device.

Figure 1:
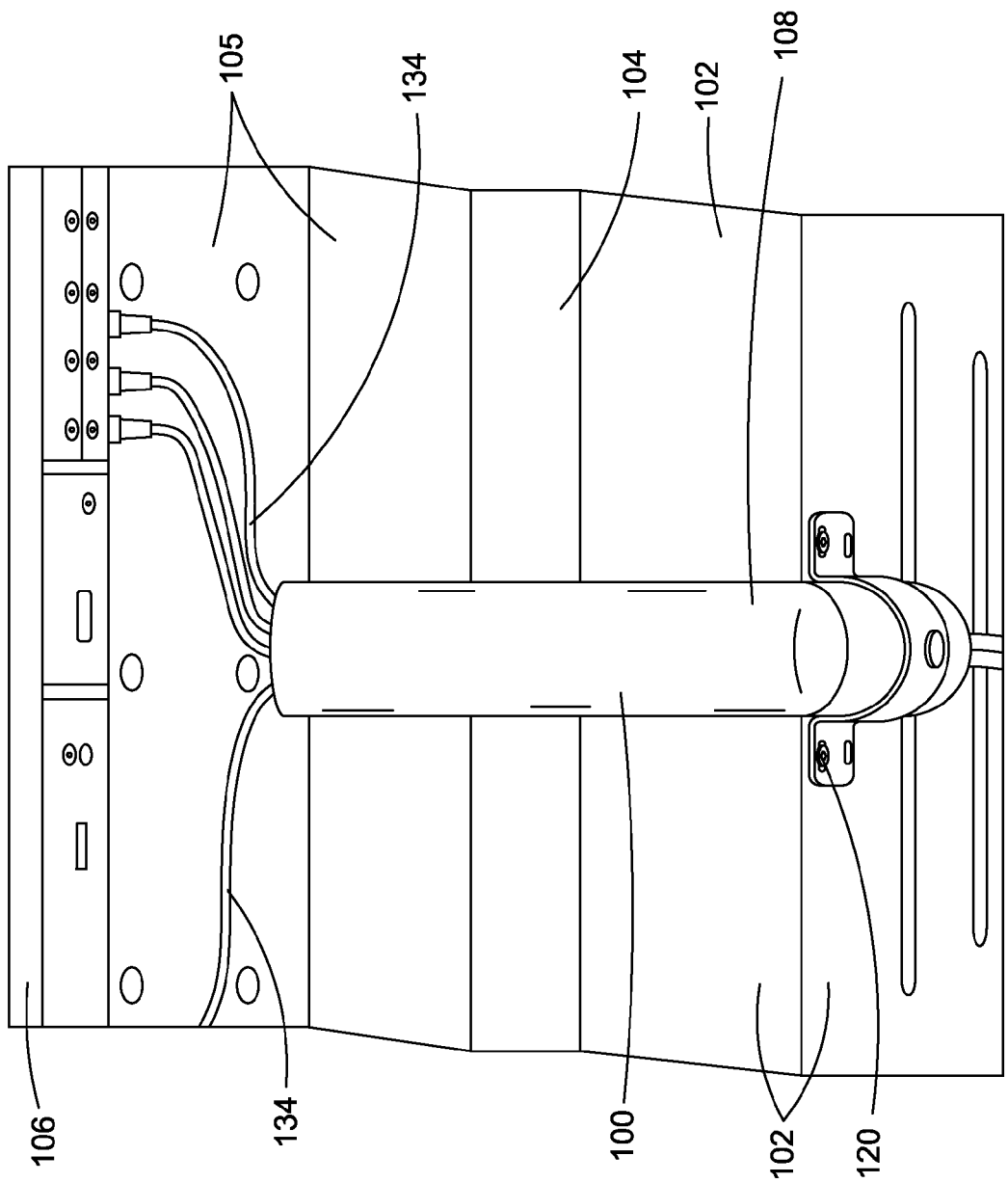
FIG. 1 is a top view of an exemplary anti-tip device coupled to a base of a flat screen display for use with embodiments.
Figure 2:
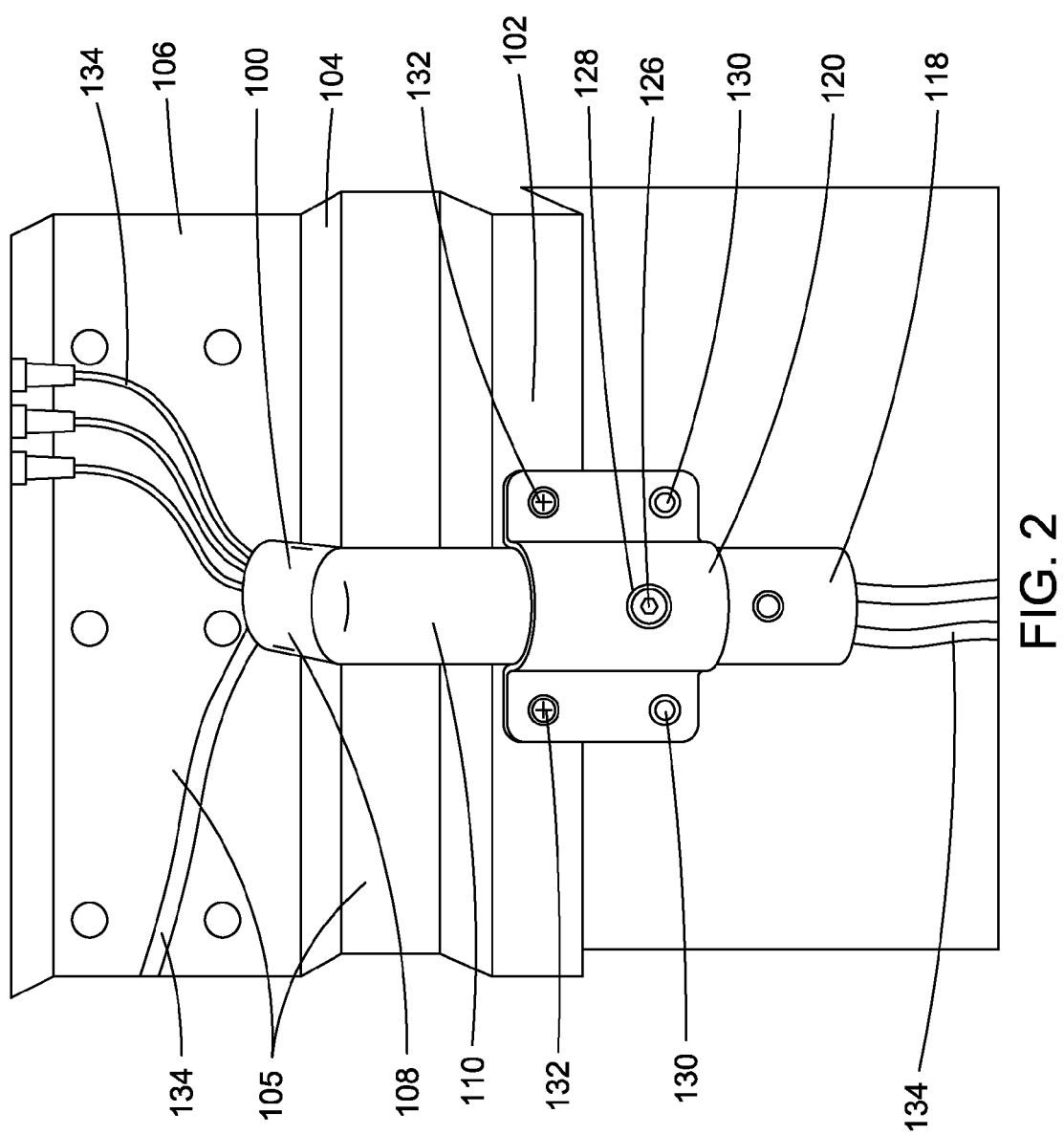
FIG. 2 is a rear view of an exemplary anti-tip device coupled to a base of a flat screen display for use with embodiments.

FIG. 1 and FIG. 2 show an anti-tip device 100 and a flat screen display 105, which may include a flat screen display body 106 and display base 104, located on top of holding unit (e.g., stand) 102. In some embodiments, the flat screen display body 106 and display base 104 may be integral with each other. In other embodiments, the flat screen display body 106 and display base 104 may be separate elements that are coupled to each other.

As shown in the embodiment at FIG. 1 and FIG. 2, the anti-tip device 100 may be disposed between the base 104 and the holding unit 102 to hold the display 105 on the stand and prevent tipping. For example, as shown, the anti-tip device 100 may be mounted to a rear of a holding unit 102. When the anti-tip device 100 is mounted to the rear of holding unit 102, a first portion 108 of the anti-tip device 100 is substantially parallel to a top of the base 104. Accordingly, the first portion 108 of the anti-tip device 100 is positioned such that when the top of the base 104 contacts the first portion 108 of the anti-tip device 100, the first portion 108 of the anti-tip device 100 is prevented from moving via the mounting to the holding unit and may prevent the base 104 and the flat screen display 106 from tipping on the holding unit 102.

In some embodiments, for example as shown in FIG. 1 and FIG. 2, when the anti-tip device 100 is mounted to the holding unit 102, the anti-tip device 100 may be in position such that the first portion 108 contacts the top of the base 104. In other embodiments, the first portion 108 may be positioned in close proximity to the top of the base 104 when the anti-tip device 100 is mounted to the holding unit 102 such that when the top of the base 104 begins to tip, the top of the base 104 may come into contact with the first portion 108 of the anti-tip device 100 and prevent further tipping of the flat screen display 105. In some embodiments, the first portion may be coupled to the base 104 and when the top of the base 104 begins to tip, the second portion 110 may come into contact with the holding unit 102 and prevent further tipping of the flat screen display 105.

Figure 3:
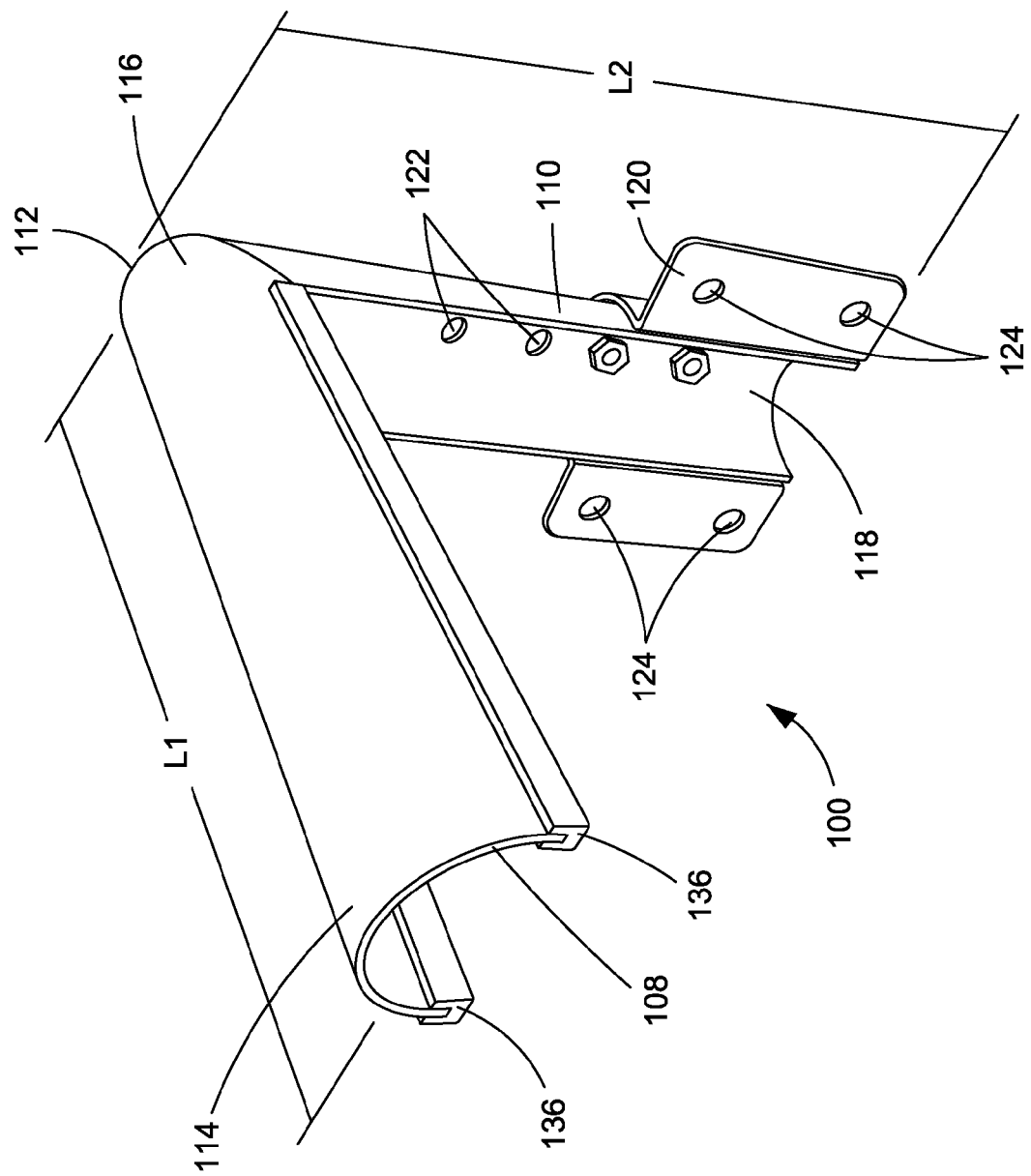
FIG. 3 is a perspective view of an exemplary anti-tip device for use with embodiments.

As shown in FIG. 3, the anti-tip device 100 may be L-shaped, having a first portion 108 and a second portion 110 extending substantially perpendicular to the first portion 108. In this configuration, when the anti-tip device 100 is mounted to the rear of holding unit 102 and the top of the base 104 contacts the first portion 108, the top of the base 104 may apply an upward force to the first portion. Responsive to this upward force, the L-shape configuration may cause the second portion 110 to contact the rear of the holding unit 102, and another force may be applied by the rear of the holding unit 102 to the second portion 110, preventing the first portion 108 from moving upward and, therefore, preventing the base 104 from moving upward and tilting (e.g., forward or backward). The anti-tip device 100 shown in FIGS. 1-3 is L-shaped.

Embodiments may include anti-tip devices having other shapes, however, which are configured to contact the base and/or the holding unit and prevent tipping of flat screen displays.

In some embodiments, anti-tip devices may extend between opposing ends, and contact between one end and the base and/or contact between the second end and the holding unit may prevent tipping of flat screen displays. For example, referring to the embodiment shown at FIG. 3, first portion 108 of anti-tip device 100 may extend a first portion length L1 between a first portion proximal end 112 and a first portion distal end 114. Second portion 110 extends away from and substantially orthogonal to the first portion 108. As shown in FIG. 3, the second portion 110 may extend a second portion length L2 between a second portion proximal end 116 and a second portion distal end 118. Accordingly, anti-tip device 100 extends between opposing ends (first portion distal end 114 and second portion distal end 118) and when first portion distal end 114 contacts between the base, contact between the second end and the holding unit may prevent tipping of flat screen display 105.

In some embodiments, the first portion 108 and the second portion 110 may be unitary. In other embodiments, however, the first portion 108 and the second portion 110 may be formed separately and coupled (e.g., coupled via hardware, snap-fit, friction-fit) together to form the anti-tip device 100.

Figure 4:
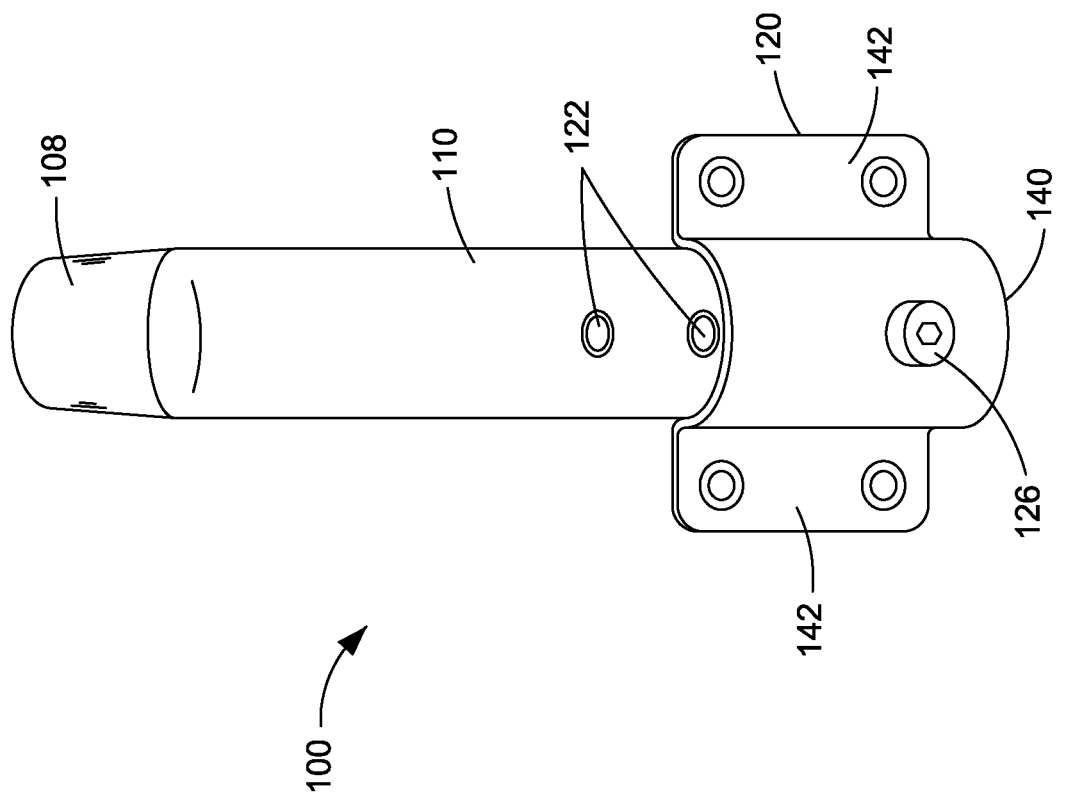
FIG. 4 is a rear view of an exemplary anti-tip device for use with embodiments.

As shown in FIG. 3 and FIG. 4, the anti-tip device 100 may also include a mounting element 120 coupled to the second portion 110. Mounting element 120 may be mounted to the holding unit 102, as shown at FIG. 1 and FIG. 2. Accordingly, when the mounting element 120 is mounted to the holding unit 102, the second portion 110 may be coupled to the holding unit 102. In the embodiment shown in FIGS. 3 and 4, the mounting element 102 is coupled to the second portion 110 and mounted to the rear of the holding unit 102. Embodiments may, however, include a mounting portion coupled to either the first portion 108 and/or the second portion 110 of the anti-tip device 100 and mounted to other areas of the holding unit other than the area shown in FIG. 1 and FIG. 2. For example, in one embodiment, the mounting element 120 may be coupled to the first portion 108 and mounted to the top of the holding unit 102. In other embodiments, the mounting element 120 may be coupled to both the first portion 108 and the second portion 110 and mounted to both the top of the holding unit 102 and the rear of the holding unit 102.

The first portion 108, the second portion 110 and the mounting element 120 may be formed of any materials strong enough to prevent bending or breaking under the force from the flat screen display 106 to prevent tipping of the flat screen display 106 on the holding unit 102, such as for example, metals, alloys, fiberglass, plastic, rubber and the like.

Figure 5:
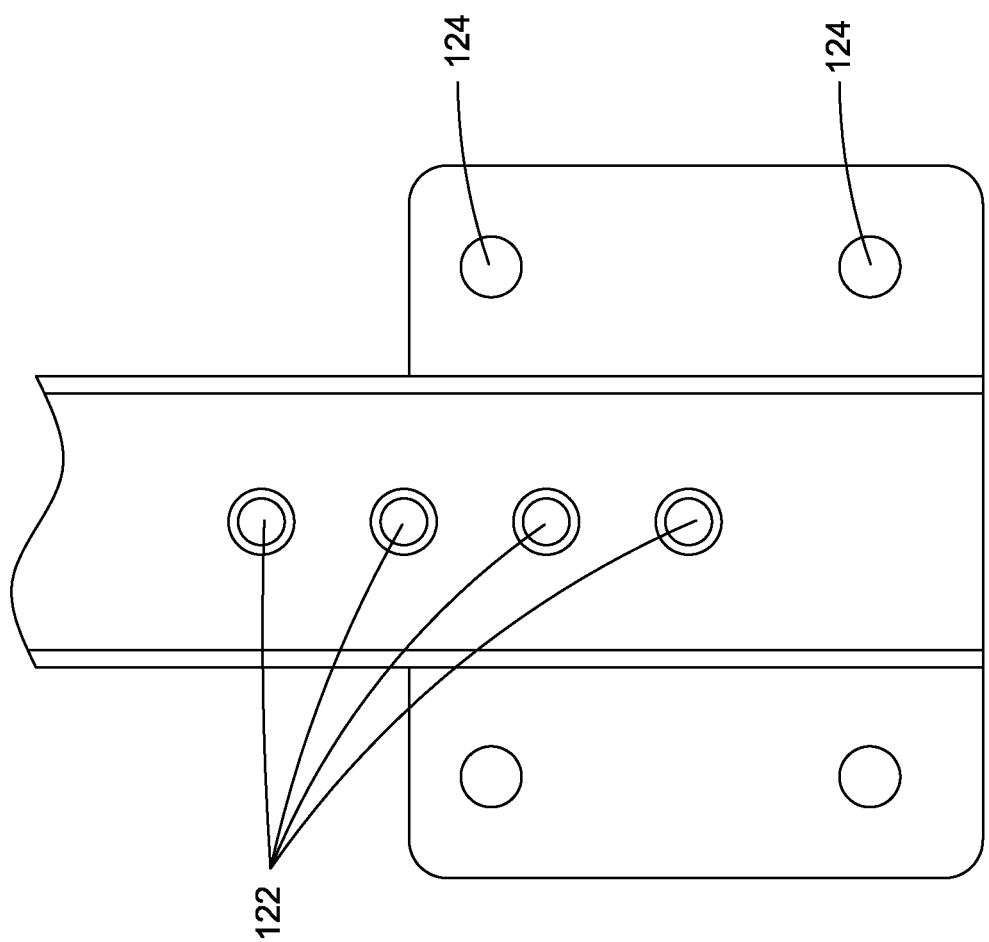
FIG. 5 is a close-up view of an underside of a portion of an exemplary anti-tip device for use with embodiments.

In some embodiments, the first portion 108 and the second portion 110 may be vertically adjustable relative to the top surface of the holding unit 102 and the base 104. For example, as shown in FIG. 3 to FIG. 5, the second portion 110 may include a plurality of coupling holes 122 and the mounting element 102 may include a single hole 128 (shown in FIG. 2). Holes 122 and hole 128 may receive bolt 126 to vertically adjust the coupling of the second portion 110. In this respect, the anti-tip device 100 may be raised and lowered to a desirable position relative to the base 104 to prevent the tipping of the base 104 and the display 106. Embodiments may include holes to receive any type of hardware (e.g., screws, pins, and the like) to adjust the second portion 108 relative to the mounting element 120, and therefore vertically adjust the second portion 108 relative to the top surface of the holding unit 102 and the base 104.

In the embodiments shown at FIG. 5, the second portion 110 includes four coupling holes 122 equally and vertically spaced from each other. Embodiments may, however, include any number of holes having any size or shape. In some embodiments, the second portion 110 may include a single continuous opening for receiving hardware to vertically adjust the second portion 110. It is contemplated that the anti-tip device 100 may also include other types of components (e.g., slots and pins) to vertically adjust the second portion 110.

A mounting element 120 may include a plurality of mounting holes to receive hardware to vertically adjust the coupling of the mounting element 120 relative to the top surface of the holding unit 102 and the base 104. For example, as shown in the embodiment at FIG. 2, mounting element 120 may include a plurality of mounting element holes 130. Mounting holes 130 may receive screws 132 to provide for the raising and lowering of the anti-tip device 100 to a desirable position relative to the top surface of the holding unit 102 and the base 104 to prevent the tipping of the flat screen display 105.

In some embodiments, portions of the anti-tip device 100 may be configured to receive and hide electrical mediums (e.g., wires, cords, cables and the like) connected to the television display 106. For example, as shown in FIGS. 1-3, the first portion 108 may be semi-cylindrical and the second portion 110 may be semi-cylindrical. As shown, electrical mediums 134 that are connected to the flat screen display may be received at the distal end 114 of first portion 108 and concealed until the electrical mediums 134 exit at distal end 118 of second portion 110.

Figure 6:
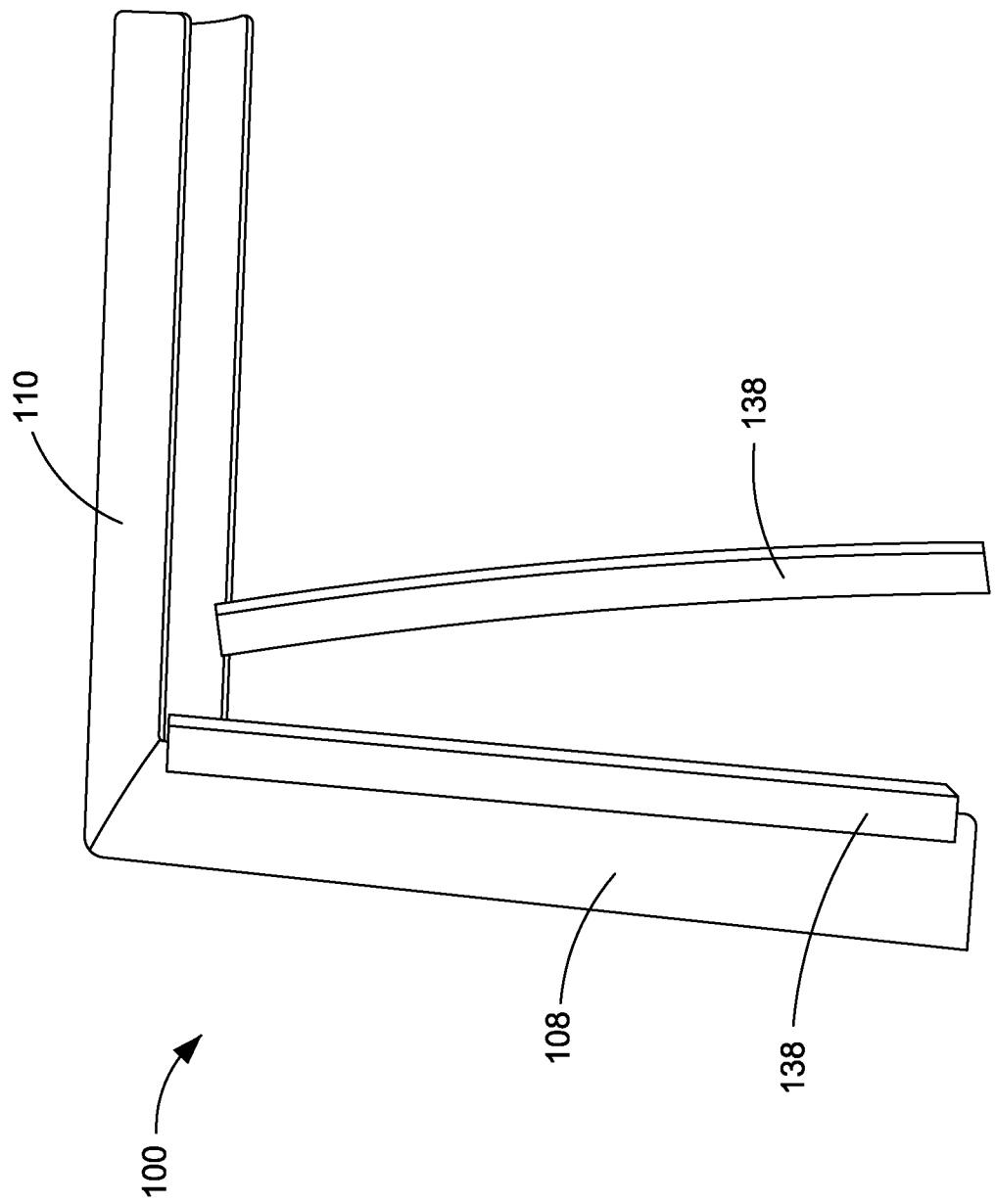
FIG. 6 is a perspective view illustrating protective portions of an exemplary anti-tip device for use with embodiments.

As shown in the embodiments at FIG. 3 and FIG. 6, the first semi-cylindrical portion 108 may include opposing bottom edges 136 extending along the length L1 of the semi-cylindrical first portion 108. Each of the opposing bottom edges 136 may be configured to contact the base 102 and prevent the television display 106 from tipping on the holding unit 102.

In some embodiments, each of the opposing bottom edges 136 may include a protective portion 138 that are configured to prevent damage to the base 104 when the base 104 contacts each protective portion 138. In some embodiments, the protective portions 138 may be removable from the opposing bottom edges 136 of the first portion 108. In other embodiments, the protective portions 138 may be integral with the opposing bottom edges 136. In some embodiments, each protective portion 138 may be formed from material sufficient to prevent damage (e.g., scratches, dents) to the base 104 and provide increased friction between each protective portion 138 and the base 104 when the base 104 contacts each protective portion 138. Materials may include any material sufficient to provide at least one of: (i) increased friction between each protective portion 138 and the base 104; and (ii) limit damage to the base 104, such as, for example, rubber, foam, felt, and plastics.

As shown at FIG. 4, the mounting element 120 may include a semi-cylindrical coupling portion 140 coupled to the semi-cylindrical second portion 110 and one or more mounting portions 142 configured to be mounted to the holding unit 102. As shown, the mounting element 120 may include a pair of opposing mounting portions 142 each extending away from the semi-cylindrical coupling portion 140. Accordingly, when the mounting element 120 is mounted to the holding unit 102, each of the pair of opposing mounting portions 142 are substantially parallel with a rear of a holding unit 102.

In the embodiments shown at FIG. 1 through FIG. 8F, the anti-tip device 100 includes semi-cylindrical portions, such as first portion 108 and second portion 110. Embodiments may include portions having different geometries (e.g., flat portions, square channel, v-shaped, etc.) for preventing the tipping of flat screen displays.

Figure 7:
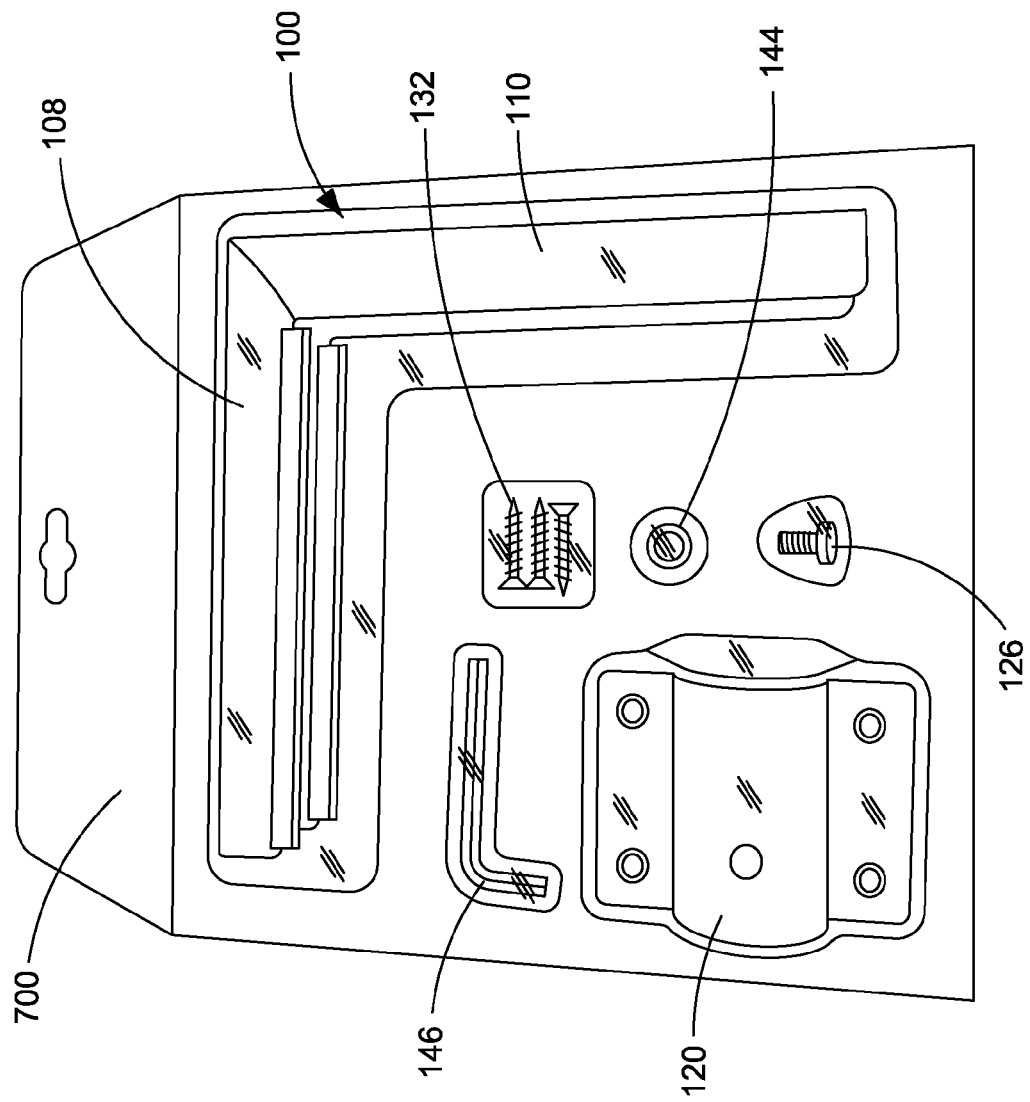
FIG. 7 is a view of individual components of an exemplary anti-tip device in exemplary packaging for use with embodiments.

FIG. 7 is a view of exemplary packaging 700 that includes individual components of an exemplary anti-tip device 100, exemplary hardware and tools to mount an exemplary anti-tip device 100 on a flat screen display holding unit. As shown in FIG. 7, exemplary packaging 700 may include an anti-tip device 100 having first portion 108 and second portion 110. Packaging 700 may also include a mounting element 120. Packaging 700 may further include hardware, such as bolt 126, screws 132 and washer 144, as well as a tool, such as Allen wrench 146.

Figure 8A:
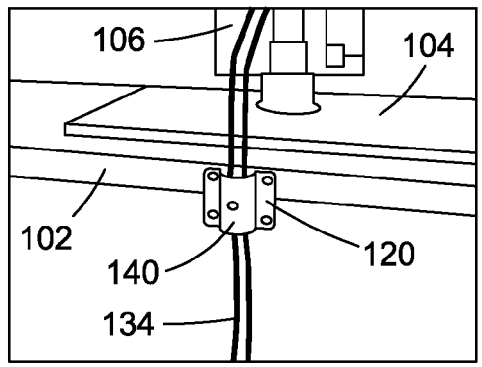
FIGS. 8A-8F illustrate a method of mounting an exemplary anti-tip device on a flat screen display holding unit for use with embodiments.

FIGS. 8A-8F illustrate exemplary instructions for mounting the exemplary anti-tip device 100 on a flat screen display holding unit using the components shown in FIG. 7. As shown in FIG. 8A, mounting the exemplary anti-tip device 100 on a flat screen display holding unit 102 may include positioning the mounting element 120 (e.g., centering the mounting element 120 with the flat screen display 106) and placing electrical mediums 134 within the semi-cylindrical coupling portion 140 of the mounting element 120. Embodiments may include positioning the mounting element 120 at any position to conceal wires connected to displays.

Figure 8B:
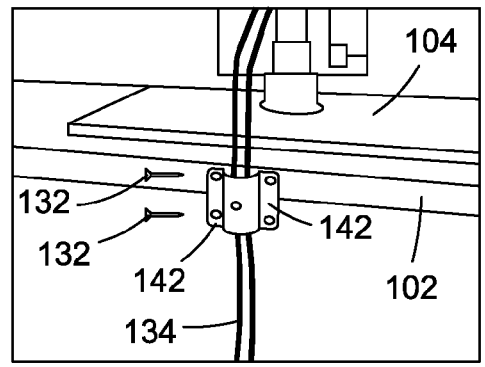

As shown in FIG. 8B, the mounting element 120 may be mounted to the rear of the holding unit 102 by placing hardware (e.g., screws 132) in holes of the mounting portions 142 of mounting element 120. Embodiments may, however, include mounting the mounting element 120 to various areas (e.g., top) of the holding unit 102 using various types of coupling elements (e.g., pins, slots and brackets).

Figure 8C:
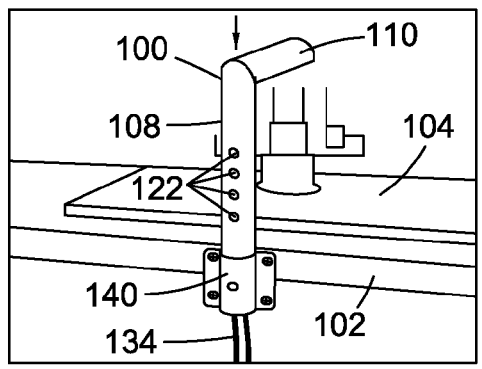
Figure 8D:
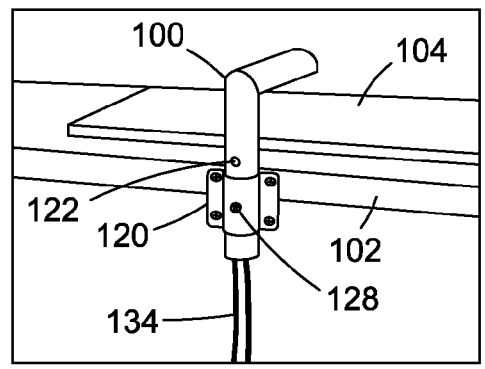

As shown in FIG. 8C, the anti-tip device 100 may be inserted into the mounting bracket 120 by placing the second semi-cylindrical portion 110 of the anti-tip device 100 into the semi-cylindrical coupling portion 140 of the mounting element 120. As shown in FIG. 8D, the anti-tip device 100 may be vertically positioned by aligning one of the holes 122 of the second portion 110 with the hole in the mounting element 120. For example, in one embodiment, the first portion 108 may be aligned at the lowest possible position relative to the base 104. In another embodiment, the first portion 108 may be aligned until the mounting element 120 rests firmly against the top of the base 104.

Figure 8E:
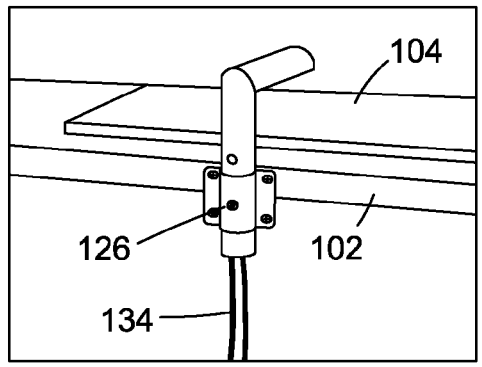
Figure 8F:
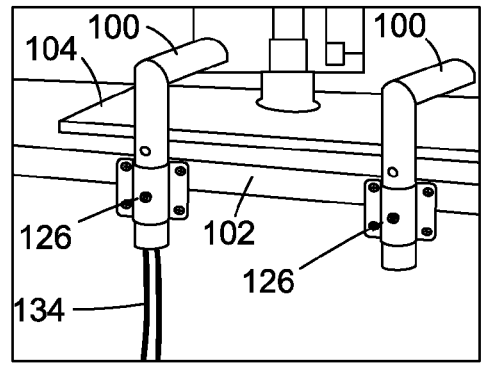

As shown in FIG. 8E, the anti-tip device 100 may be coupled to the mounting element 120 at the selected position using hardware (e.g., bolt 126). A tool, such as Allen wrench 146 (shown in FIG. 7), may be used to couple the anti-tip device 100 to the mounting element 120. As shown in FIG. 8F, multiple anti-tip devices 100 may be mounted to the flat screen holding unit 102 for larger flat screen displays (e.g., television displays having greater than a 32 inch diagonal display screen). Embodiments may, however, include any number (e.g., one or more) of anti-tip devices 100 to prevent tipping of flat screen displays 105.

Although the embodiments have been described with reference to exemplary embodiments, they are not limited thereto. Those skilled in the art will appreciate that numerous changes and modifications may be made to the preferred embodiments and that such changes and modifications may be made without departing from the true spirit of the embodiments. It is therefore intended that the appended claims be construed to cover all such equivalent variations as fall within the true spirit and scope of the embodiments.

What is claimed is:

1. An anti-tip device for preventing the tipping of a display device, comprising:
    a first portion extending a first portion length between a first portion proximal end and a first portion distal end;
    a second portion extending away from and extending substantially orthogonal to the first portion, the second portion extending a second portion length between a second portion proximal end and a second portion distal end and configured to be coupled to a holding unit configured to hold a flat screen display;
    a mounting element configured to be mounted to the flat screen display holding unit and coupled to the second portion;
    wherein the second portion is coupled to the flat screen display holding unit when the mounting element is mounted to the flat screen display holding unit;
    wherein when the second portion is coupled to the flat screen display holding unit and a base contacts the first portion, the first portion is configured to prevent the flat screen display from tipping on the holding unit; and
    wherein the first portion and the second portion are semi-cylindrical and the first portion and the second portion are configured to receive one or more electrical mediums coupled to the flat screen display within an underside that faces the holding unit.

2. The anti-tip device of claim 1, wherein the mounting element includes a mounting element coupling hole and the second portion comprises a plurality of second portion coupling holes each vertically spaced from each other, and
    wherein the second portion is configured to be vertically adjustable relative to the mounting element by coupling the second portion to the mounting element via one of the plurality of second portion coupling holes and the mounting element coupling hole.

3. The anti-tip device of claim 1, wherein the mounting element comprises a plurality of mounting holes each vertically spaced from each other, and
    wherein the mounting element is configured to be vertically adjustable relative to the holding unit by coupling the mounting element to the holding unit via one of the mounting holes.

4. The anti-tip device of claim 1, wherein the first semi-cylindrical portion further comprises opposing bottom edges, each of the opposing bottom edges configured to contact the base and prevent the flat screen display from tipping on the holding unit.

5. The anti-tip device of claim 4, wherein each of the opposing bottom edges comprise a protective portion configured to contact the base, each protective portion formed of material to at least one of: (i) prevent damage to the base; and (ii) provide increased friction between each protective portion and the base when the base contacts each protective portion.

6. The anti-tip device of claim 5, wherein each protective portion is formed of a material from a group of materials comprising rubber, foam, felt, and plastic.

7. An anti-tip device for preventing the tipping of a display device, comprising:
    a first semi-cylindrical portion extending horizontally between a first portion proximal end and a first portion distal end and configured to be parallel with a top of a base of a flat screen display;
    a second semi-cylindrical portion extending vertically away from and substantially orthogonal to the first semi-cylindrical portion, and extending between a second portion proximal end and a second portion distal end, the second semi-cylindrical portion configured to be coupled to a flat screen display holding unit; and
    a mounting element configured to be coupled between the flat screen display holding unit and the second semi-cylindrical portion, the mounting unit comprising:
        a semi-cylindrical coupling portion configured to be coupled to the second semi-cylindrical portion; and one or more mounting portions configured to be mounted to the holding unit.

8. The anti-tip device of claim 7, wherein the one or more mounting portions comprise a pair of opposing mounting portions each extending away from the semi-cylindrical coupling portion, and configured to be substantially parallel with a rear of a holding unit and mounted to the holding unit.

9. The anti-tip device of claim 7, wherein the first semi-cylindrical portion and the second semi-cylindrical portion are each configured to receive one or more electrical mediums coupled to the flat screen display.

10. The anti-tip device of claim 7, wherein when the mounting element is mounted to the holding unit, the second semi-cylindrical portion is configured to vertically adjust relative to the mounting element.

11. The anti-tip device of claim 7, wherein the mounting element is configured to vertically adjust relative to the holding unit.

12. The anti-tip device of claim 7, wherein the first semi-cylindrical portion further comprises opposing bottom edges extending along the first semi-cylindrical portion, each of the opposing bottom edges configured to prevent the flat screen display from tipping on the holding unit when the base contacts the opposing edges.

13. The anti-tip device of claim 7, wherein each of the opposing bottom edges comprise a protective portion configured to contact the base and prevent damage to the base when the base contacts each protective portion.

* * * * *